United States Patent
Tanimoto

(10) Patent No.: US 8,610,947 B2
(45) Date of Patent: Dec. 17, 2013

(54) IMAGE FORMING APPARATUS USING LOGICAL ARITHMETIC PROCESSING AND IMAGE FORMING PROGRAM USING LOGICAL ARITHMETIC PROCESSING

(75) Inventor: Shusuke Tanimoto, Kanagawa (JP)

(73) Assignee: Fuji Xerox Co., Ltd, Tokyo (JP)

(*) Notice: Subject to any disclaimer, the term of this patent is extended or adjusted under 35 U.S.C. 154(b) by 1129 days.

(21) Appl. No.: 12/544,754

(22) Filed: Aug. 20, 2009

(65) Prior Publication Data

US 2010/0238464 A1 Sep. 23, 2010

(30) Foreign Application Priority Data

Mar. 19, 2009 (JP) ................................ 2009-067504

(51) Int. Cl.
*G06F 15/00* (2006.01)
*G06F 7/38* (2006.01)

(52) U.S. Cl.
USPC .......................................... 358/1.9; 712/221

(58) Field of Classification Search
None
See application file for complete search history.

(56) References Cited

U.S. PATENT DOCUMENTS

| 2007/0217002 A1 | 9/2007 | Fukue |
| 2008/0122868 A1 | 5/2008 | Mizutani et al. |

FOREIGN PATENT DOCUMENTS

| JP | A-2002-334341 | 11/2002 |
| JP | A-2003-271978 | 9/2003 |
| JP | A-2007-41225 | 2/2007 |
| JP | A-2007-241738 | 9/2007 |
| JP | A-2008-17135 | 1/2008 |
| JP | A-2008-22270 | 1/2008 |

OTHER PUBLICATIONS

Japanese Office Action issued in Japanese Application No. 2009-067504 on Mar. 24, 2011 (with translation).

*Primary Examiner* — Benny Q Tieu
*Assistant Examiner* — Sunil Chacko
(74) *Attorney, Agent, or Firm* — Oliff & Berridge, PLC

(57) ABSTRACT

An image processing apparatus includes an interpreting unit that interprets an order of the logical arithmetic processing and a kind of a logical arithmetic processing; and a drawing unit that, in a case of drawing the image information as raster data, draws from an element of an upper-order side in order of the logical arithmetic processing interpreted by the interpreting unit with respect to an area that is interpreted to be processed by a simple overwrite processing for giving priority to an uppermost-order side element as the kind of the logical arithmetic processing, and draws using a calculation sequentially from an element of a lower-order side in order of the logical arithmetic processing interpreted by the interpreting unit with respect to an area that is interpreted to be processed by a logical arithmetic processing for using the calculation as to the overlapped elements as the kind of the logical arithmetic processing.

10 Claims, 9 Drawing Sheets

ELEMENT (2) ELEMENT (3) ELEMENT (4) ELEMENT (5) ELEMENT (1) ELEMENT (1)

ELEMENT (2)

ELEMENT (3)

ELEMENT (4)

ELEMENT (5)

ELEMENT (2)  ELEMENT (3)  ELEMENT (4)  ELEMENT (5)  ELEMENT (1)

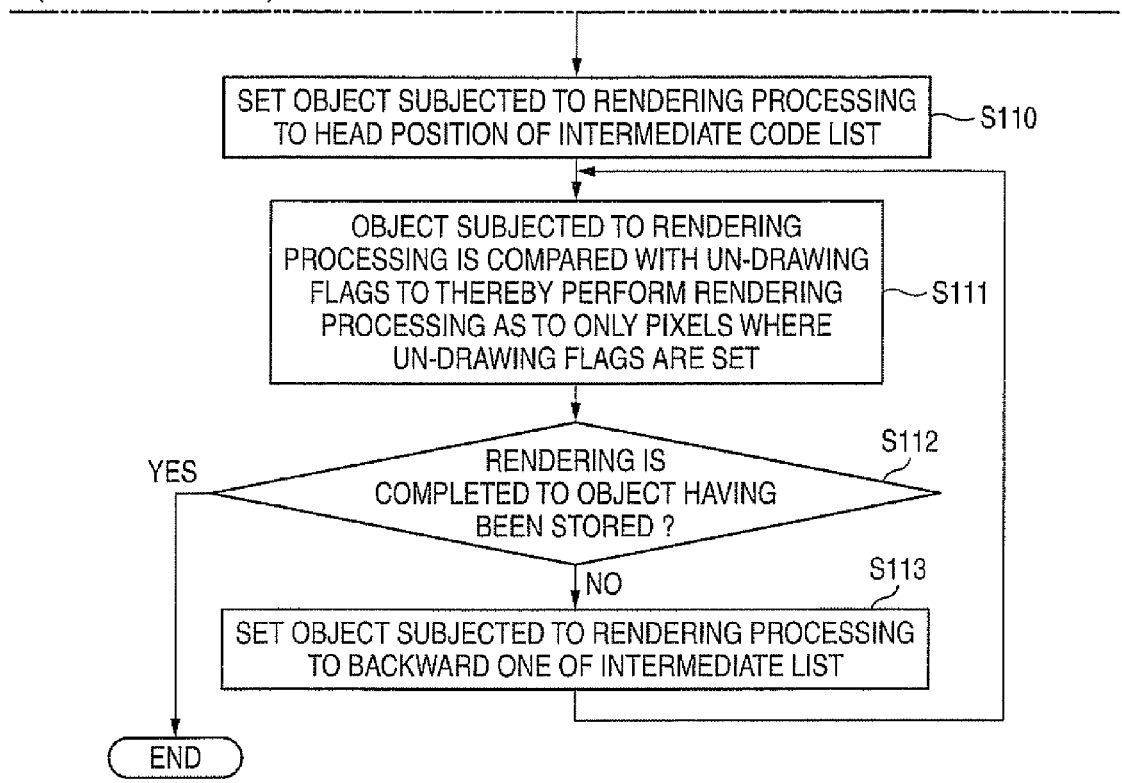

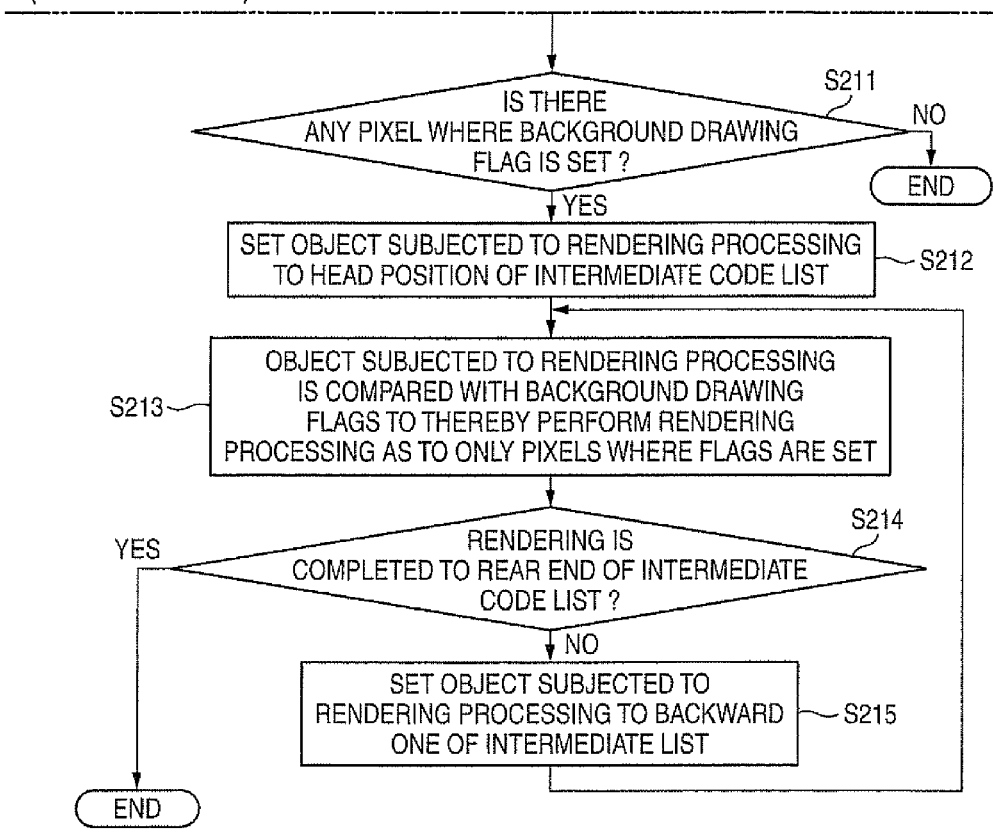

IMAGE FORMING APPARATUS USING LOGICAL ARITHMETIC PROCESSING AND IMAGE FORMING PROGRAM USING LOGICAL ARITHMETIC PROCESSING

CROSS-REFERENCE TO RELATED APPLICATION

This application is based on and claims priority under 35 USC 119 from Japanese Patent Application No. 2009-067504 filed Mar. 19, 2009.

BACKGROUND

1. Technical Field

The present invention relates to an image forming apparatus and an image forming program.

2. Related Art

In a printer of a type for once converting drawing objects to be subjected to an image processing into intermediate codes and holding the codes, PDL (page description language) of one page is interpreted and the intermediate codes are generated. When the intermediate codes are generated, the intermediate codes are interpreted and subjected to the rendering processing from the head position thereof sequentially in the drawing order to thereby be converted into raster data capable of being printed. Thus, in the case where another object is overwritten at a portion having been drawn due to the overlap of drawing objects, the rendering processing having been performed becomes wasteful.

SUMMARY

According to an aspect of the invention, an image processing apparatus includes an interpreting unit that interprets an order of the logical arithmetic processing and a kind of a logical arithmetic processing as to a plurality of elements contained in an image information being inputted; and a drawing unit that, in a case of drawing the image information as raster data, draws from an element of an upper-order side in order of the logical arithmetic processing interpreted by the interpreting unit with respect to an area that is interpreted to be processed by a simple overwrite processing for giving priority to an uppermost-order side element as the kind of the logical arithmetic processing interpreted by the interpreting unit, and draws using a calculation sequentially from an element of a lower-order side in order of the logical arithmetic processing interpreted by the interpreting unit with respect to an area that is interpreted to be processed by a logical arithmetic processing for using the calculation as to the overlapped elements as the kind of the logical arithmetic processing interpreted by the interpreting unit.

BRIEF DESCRIPTION OF THE DRAWINGS

Embodiments of the invention will be described in detail based on the following figures, wherein.

DETAILED DESCRIPTION

Hereinafter, a mode (hereinafter called an implementation mode) for implementing the invention will be explained. The explanation will be made in the following order.
1. Configuration of an image processing apparatus
2. Concrete example of a logical arithmetic processing by the image processing apparatus
3. Image processing program <1. Configuration of Image Processing Apparatus>

Figure 1:
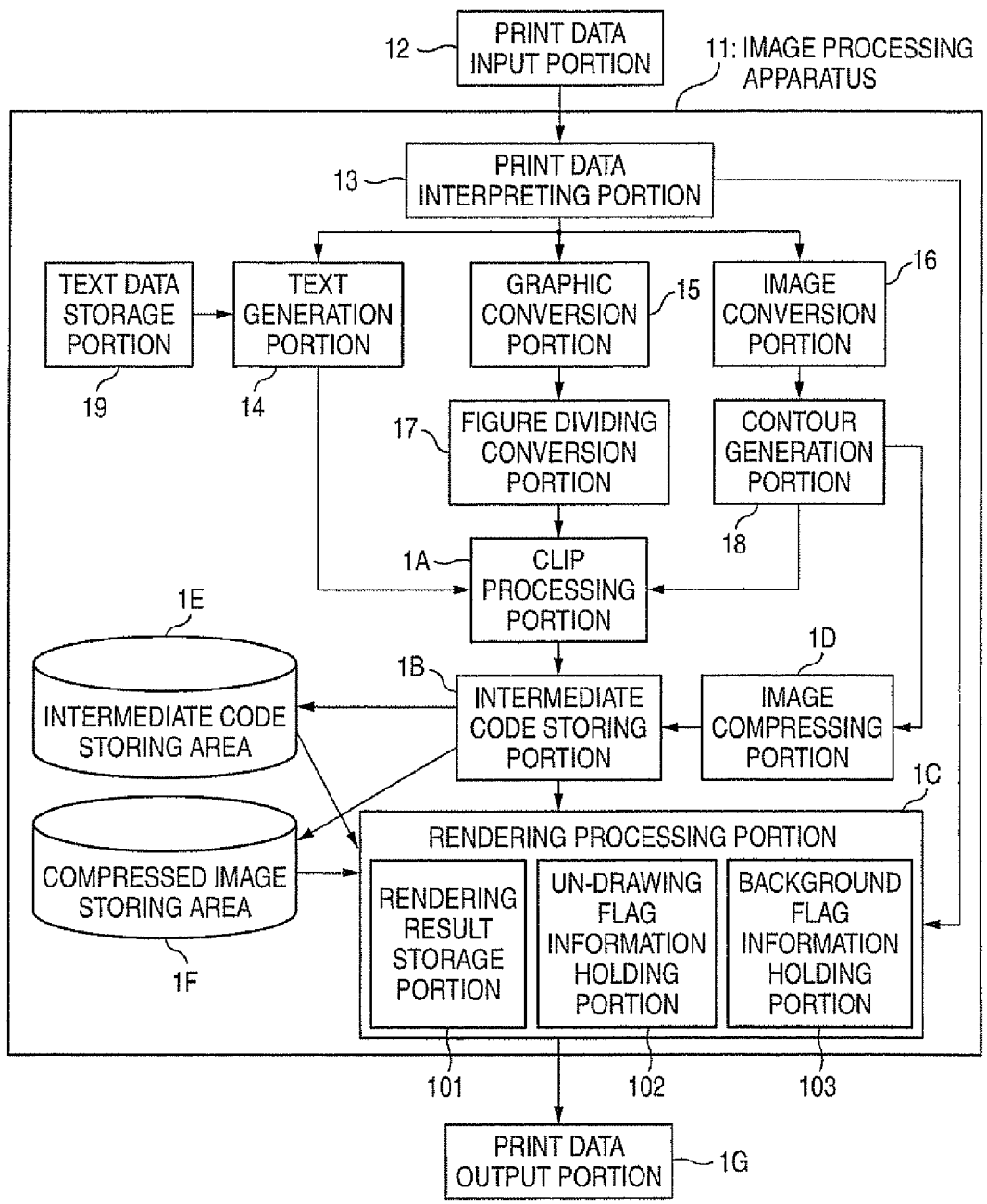
FIG. 1 is a block diagram for explaining the inner configuration of the image processing apparatus according to an implementation mode.
Figure 2A:
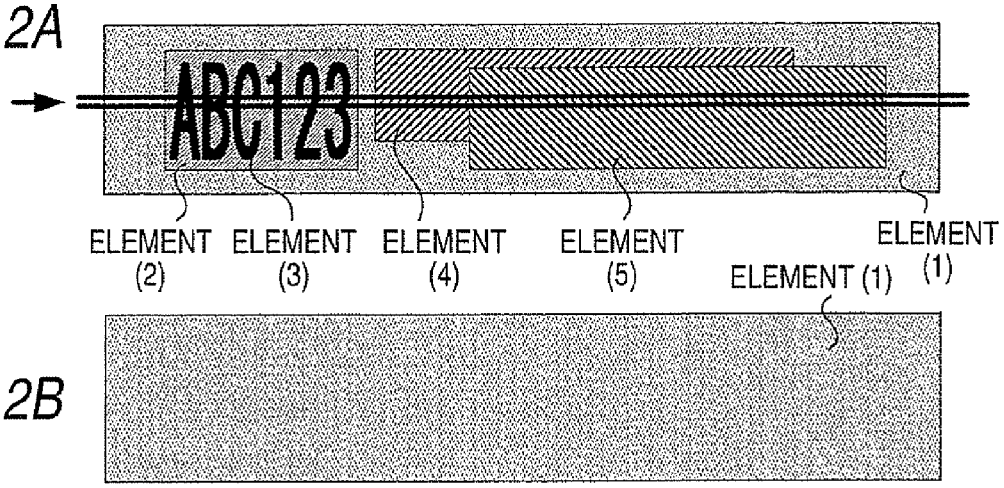
FIGS. 2A-2F are Diagrams showing an example of the configuration of elements used for explaining the concrete example of a logical arithmetic processing by the image processing apparatus according to the implementation mode.
Figure 2B:
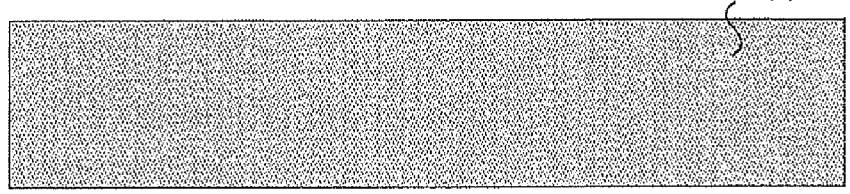
Figure 2C:
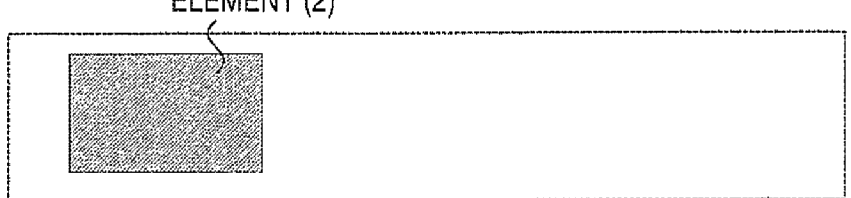
Figure 2D:
Figure 2E:
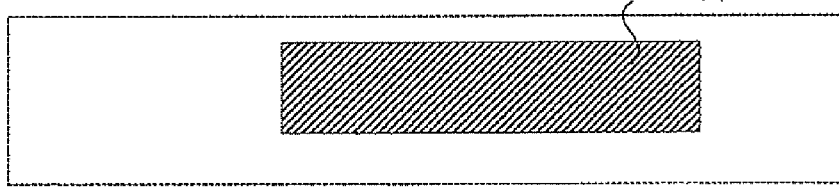
Figure 2F:
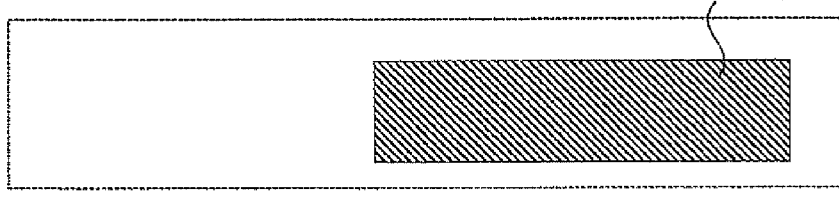

FIG. 1 is a block diagram for explaining the inner configuration of the image processing apparatus according to the implementation mode. The image processing apparatus according to the implementation mode treats print data as an example of image information to be processed, and performs the processing of interpreting print data having been inputted and developing the interpreted print data as raster data for printing.

The image processing apparatus 11 is provided between a print data input portion 12 for inputting the print data and a print data interpreting portion 13 for outputting the print data.

The image processing apparatus 11 includes the print data interpreting portion 13, a text generation portion 14, a graphic conversion portion 15, an image conversion portion 16, a figure dividing conversion portion 17, a contour generation portion 18, a text data storage portion 19, a clip processing portion 1A, an intermediate code storing portion 1B, a rendering processing portion 1C, an image compressing portion 1D, an intermediate code storing area 1E and a compressed image storing area 1F.

In the image processing apparatus 11, firstly the print data input portion 12 inputs the print data sent from a higher-level apparatus such as a personal computer and, as the case may be, stores plural data in order to adjust the data so as to smoothly perform the succeeding processings. The print data is described by PDL (page description language), for example.

The print data is classified into text data, graphic data, image data etc. by the print data interpreting portion 13. The data thus classified is sent together with necessary information to the corresponding conversion/generation portions for processing the data.

First, in the case of the text, the text data is sent to the text generation portion 14. The text generation portion 14 generates contour data of the text adapted to the coordinate space of the output data based on the received data and data of the outline format stored in the text data storage portion 19 which is held within the image processing apparatus 11 before the input of the print data.

When the print data is classified as the graphic data by the print data interpreting portion 13, data sequence representing coordinate values is sent to the graphic conversion portion 15. The graphic conversion portion 15 converts the received data into data adapted to the coordinate space of the output data.

Thereafter, the figure dividing conversion portion 17 divides the data thus converted into an aggregate of simple figures which are closer to the output data than the data at the input stage. The aggregate is an aggregate of geometric data such as triangles and trapezoids.

When the print data is classified as the image data by the print data interpreting portion 13, the data thus classified is sent to the image conversion portion 16. The image conversion portion 16 subjects the image data to the enlargement/reduction processing of the image and/or the adjustment of the color space etc., and simultaneously generates contour data for representing the contour of the image.

Further, the print data interpreting portion 13 interprets order of the logical arithmetic processing and the kind of the logical arithmetic processing as to each of plural elements (attributes such as text, graphics, images) contained in the inputted print data.

In this case, as to order of the logical arithmetic processing, the lower side is called a lower-order side and the upper side is called an upper-order side in the case where plural elements are superimposed. Further, the kinds of the logical arithmetic processings include a simple overwrite processing and a logical arithmetic processing. The simple overwrite processing is arranged in a manner that when the plural elements are superimposed, the upper-order side element is set to have a higher priority (the upper-order side element is overwritten on the lower-order side element) as to a superimposed area. The logical arithmetic processing is arranged in a manner that when the plural elements are superimposed, the data of each of the superimposed elements is determined by the calculation. For example, the logical arithmetic processings includes a semi-transparent processing for outputting the data of the respective superimposed elements with predetermined ratios, a processing of subjecting the superimposed elements to an AND or OR processing (to be concrete, ROP (raster operation), a processing for masking the lower-order side element by the upper-order side element etc.

Next, the text data, the graphic data and the contour data of the image are transmitted to the clip processing portion 1A. The clip processing is a processing for cutting a figure extruding from a page or cutting a figure in a region of a free shape set in advance, for example.

Thereafter, the drawing data thus subjected to the clip processing is sent to the intermediate code storing portion 1B. Figure shapes and the contour shapes of images etc. of the drawing data thus sent to the intermediate code storing portion 1B are converted by the rendering processing portion 1C into intermediate data suitable for being outputted to the print data output portion 1G and stored in the intermediate code storing area 1E.

On the other hand, the image data outputted from the image conversion portion 16 is compressed according to the predetermined compression method by the image compressing portion 1D and stored in the compressed image storing area 1F via the intermediate code storing portion 1B.

The aforesaid processings are repeated until the print information of one page is inputted to thereby store the intermediate data and the compression image data of one page.

The rendering processing portion 1C converts the intermediate data and the compression image data thus stored by the aforesaid processings into data format suitable for the print data output portion 1G in accordance with the data output instructions analyzed by the print data interpreting portion 13 and sends the data to the print data output portion 1G.

The rendering processing portion 1C includes a rendering result storage portion 101, an un-drawing flag information holding portion 102 and a background flag information holding portion 103. The rendering result storage portion 101 acts as a memory portion for storing the results of the rendering processing for the raster data. The un-drawing flag information holding portion 102 acts as a memory portion for storing flags each representing that the corresponding one of the respective pixels of a unit (a band, a scanning line etc.) for the rendering processing is not drawn yet. The background flag information holding portion 103 acts as a memory portion for storing flags each representing that the corresponding one of the pixels subjected to the rendering processing is subjected to the logical arithmetic processing.

In the image processing apparatus 11 according to the implementation mode, in the case of subjecting the print data to the rendering processing for the raster data by the rendering processing portion 1C, the drawing is performed sequentially from the upper-order side element of order of the logical arithmetic processing as to the region interpreted as the simple overwrite processing, whilst the drawing is performed sequentially from the lower-order side element of order of the logical arithmetic processing as to the region interpreted as the logical arithmetic processing.

<2. Concrete Example of Logical Arithmetic Processing by Image Processing Apparatus>

FIG. 2 is diagrams showing an example of the configuration of the elements used for explaining the concrete example of the logical arithmetic processing by the image processing apparatus according to the implementation mode. The logical arithmetic processing is performed by the rendering processing portion 1C (see FIG. 1) of the image processing apparatus. The rendering processing portion 1C interprets the intermediate codes at every predetermined unit (for example, a band) and outputs the pixel data as a result of the logical arithmetic processing of the elements.

FIG. 2 is image drawings representing the predetermined intermediate codes of one band. The example of the band includes elements (1) to (5). FIG. 2A shows the arrangement and the superimposed state of all the elements (1) to (5). FIGS. 2B to 2F respectively show the elements (1) to (5). FIG. 2B shows the element (1) which corresponds to the background. FIG. 2C shows the element (2) as to which the logical arithmetic processing is performed between this element and the element (1) in this concrete example. FIG. 2D shows the element (3) which corresponds to a character portion subjected to the simple overwrite processing on the element (2) in this concrete example.

FIG. 2(*e*) shows the element (4) which corresponds to an image subjected to the simple overwrite processing on the element (1) in this concrete example. FIG. 2F shows the element (5) which corresponds to an image subjected to the simple overwrite processing on the element (1) and the element (4) in this concrete example. The print data interpreting portion 13 (see FIG. 1) interprets order of the logical arithmetic processing and the kind of the logical arithmetic processing as to each of these elements (1) to (5). In this concrete example, the elements are superimposed in the order of the elements (1) to (5) and so the element with a smaller number is lower in the order.

Next, the explanation will be made as to the logical arithmetic processing using this concrete example. Although the first and second embodiments are explained hereinafter, firstly the processing common to these embodiments will be explained.

[Logical Arithmetic Processing Common to Each Embodiment]

FIG. 3 is diagrams for explaining the logical arithmetic processing common to the respective embodiments. In this case, the explanation is made as to the processing noticed to a predetermined one line (see a line shown by an arrow in the figure) as to the intermediate codes of the concrete example shown in FIG. 3A.

The flow of the processings as to this line will be explained together with the un-drawing flags and the drawing results shown in FIGS. 3B to 3E. The un-drawing flags schematically shows the state thereof being stored in the un-drawing flag information holding portion 102 (see FIG. 1), and the drawing results schematically show the raster data obtained by the processings, each of which corresponds to the information of the pixels of the noticed one line.

Figure 3A:
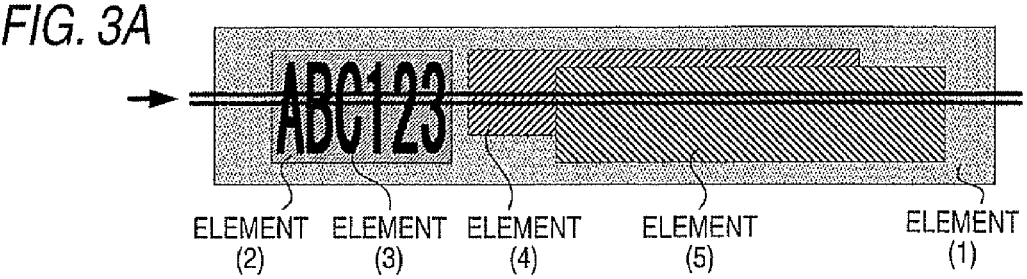
FIGS. 3A-3E are Diagrams for explaining the logical arithmetic processing common to respective embodiments.
Figure 3B:
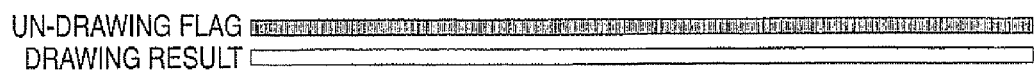

First, the rendering processing portion 1C (hereinafter see FIG. 1) initializes the un-drawing flags as shown in FIG. 3B. Before the processing, the un-drawing flags are set for all the pixels (see vertical stripes in the figure). Further, the drawing result is not outputted as to each of all the pixels.

Next, the rendering processing portion 1C performs the rendering processing as to the element (5) of the uppermost-order side among the plural elements which logical arithmetic processing orders are interpreted by the print data interpreting portion 13 (hereinafter see FIG. 1). The rendering processing portion 1C receives the kind of the logical arithmetic processing of the element (5) as the simple overwrite processing from the print data interpreting portion 13, at the time of performing the processing of the element (5).

Figure 3C:

As shown in FIG. 3C, the rendering processing portion 1C outputs the pixel information of the element (5) as the drawing results to the pixel areas where the un-drawing flags are set within this pixel region, with reference to the un-drawing flags of the pixel region of the element (5) on the noticed line. When the drawing results is outputted, the un-drawing flags corresponding to the pixel areas are reset.

Next, the rendering processing portion 1C performs the rendering processing as to the element (4) lower by one order than the element (5) having been processed among the plural elements which logical arithmetic processing orders are interpreted by the print data interpreting portion 13.

Figure 3D:
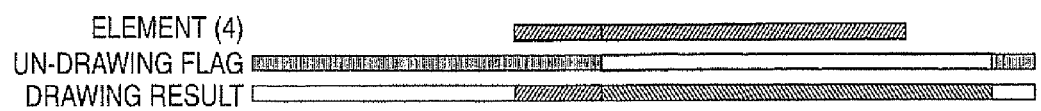

The rendering processing portion 1C receives the kind of the logical arithmetic processing of the element (4) as the simple overwrite processing from the print data interpreting portion 13, at the time of performing the processing of the element (4). As shown in FIG. 3D, the rendering processing portion 1C outputs the pixel information of the element (4) as the drawing results to the pixel areas where the un-drawing flags are set within the pixel region, with reference to the un-drawing flags of the pixel region of the element (4) on the noticed line.

In this case, since the un-drawing flags of the portion of the pixel region of the element (4) as to which the drawing results of the element (5) is outputted are reset, the pixel information of the element (4) is not outputted to the portion. That is, since the simple overwrite processing is performed for each of the elements (4) and (5), the processing of the element (5) having the upper order is performed with a higher priority as to the portion where the elements (4) and (5) are overlapped within the pixel region of the element (4). The pixel information of the element (4) is outputted as the drawing results to only the pixel areas where the un-drawing flags are set. When the drawing results is outputted, the un-drawing flags corresponding to the pixel areas are reset.

Next, the rendering processing portion 1C performs the rendering processing as to the element (3) lower by one order than the element (4) having been processed among the plural elements which logical arithmetic processing orders are interpreted by the print data interpreting portion 13.

Figure 3E:
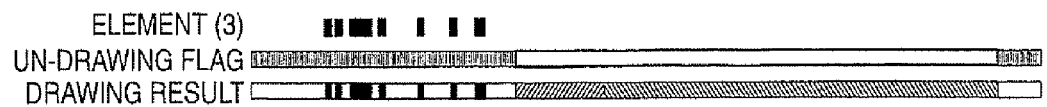

The rendering processing portion 1C receives the kind of the logical arithmetic processing of the element (3) as the simple overwrite processing from the print data interpreting portion 13, at the time of performing the processing of the element (3). As shown in FIG. 3E, the rendering processing portion 1C outputs the pixel information of the element (3) as the drawing results to the pixel areas where the un-drawing flags are set within the pixel region, with reference to the un-drawing flags of the pixel region of the element (3) on the noticed line.

In this case, since the un-drawing flags are set with respect to the entirety area of the pixel region of the element (3), the pixel information of the entirety of the pixel region of the element (3) is outputted as the drawing results. When the drawing results is outputted, the un-drawing flags corresponding to this pixel region are reset.

In this manner, at the time of subjecting the pixel information of the noticed one line to the rendering processing, the rendering processing portion 1C performs the rendering processing sequentially from the element of the uppermost-order side among the plural elements. In this case, when the kind of the logical arithmetic processing of the element interpreted by the print data interpreting portion 13 is the simple overwrite processing, the drawing results is outputted to the pixel region where the un-drawing flags are set in the order from the upper-order side to the lower-order side.

[Processing of First Embodiment]

Figure 4A:
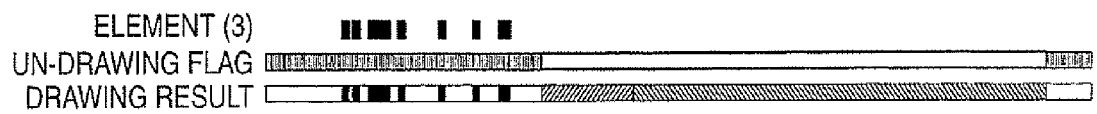
FIGS. 4A-4C are Drawings for explaining the logical arithmetic processing of the first embodiment.
Figure 4B:
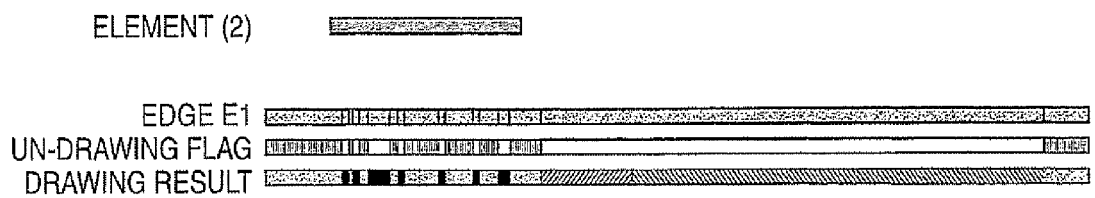
Figure 4C:
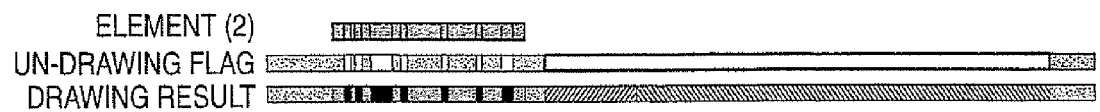

FIG. 4 is drawings for explaining the logical arithmetic processing of the first embodiment. Like FIG. 3, FIG. 4 shows the processing of the noticed line as to the intermediate codes of the concrete example shown in FIG. 3A and also shows un-drawing flags and the changes of drawing results. The processings up to the element (3) are same as the common logical arithmetic processings explained above. FIG. 4A shows a state that the processings up to the element (3) are completed.

Next, the rendering processing portion 1C performs the rendering processing as to the element (2) lower by one order than the element (3) having been processed among the plural elements which logical arithmetic processing orders are interpreted by the print data interpreting portion 13.

The rendering processing portion 1C receives the kind of the logical arithmetic processing of the element (2) as the logical arithmetic processing from the print data interpreting portion 13, at the time of performing the processing of the element (2). Since the kind of the logical arithmetic processing of the element (2) is the logical arithmetic processing, the rendering processing portion 1C reverses the order of the logical arithmetic processings as to the regions having not been processed yet.

That is, as to the pixel regions where the un-drawing flags are set at this time, the pixel information of the element (1) which is the element of the lowest-order side is outputted as the drawing results. When the order of the logical arithmetic processings is reversed, the update of the un-drawing flags is stopped hereinafter.

Next, the rendering processing portion 1C performs the rendering processing as to the element (2) higher by one order than the element (1) having been processed among the plural elements which logical arithmetic processing orders are interpreted by the print data interpreting portion 13. The rendering processing portion 1C receives the kind of the logical arithmetic processing of the element (2) as the logical arithmetic processing from the print data interpreting portion 13 and executes the calculation processing between the element (2) and the element (1) having been processed previously.

That is, the logical calculation is preformed between the pixel information of the element (2) and the pixel information of the element (1) outputted as the drawing results as to the pixel areas where the elements (1) and (2) are overlapped within the pixel region of the element (1) having been processed previously.

According to such the processing, even when the logical arithmetic processing is contained in the logical arithmetic processing, the wasteful processing of the superimposition can be suppressed by reversing the processing order performed on and after the logical arithmetic processing.

[Processing of Second Embodiment]

FIG. 5 is drawings for explaining the logical arithmetic processing of the second embodiment. Also Ike FIG. 3, FIG. 5 shows the processing of the noticed line as to the intermediate codes of the concrete example shown in FIG. 3A and shows flags and the changes of drawing results.

The flags shown in FIG. 5 include un-drawing flags and background flags. The background flag is information to be held in the background flag information holding portion 103 (see FIG. 1) and represents a pixel to be subjected to the logical arithmetic processing later. In FIG. 5, the un-drawing flag is represented by vertical stripes and the background flag is represented by horizontal stripes.

In the processing of the second embodiment, also the processings up to the element (3) are same as the common logical arithmetic processings explained above.

Next, the rendering processing portion 1C performs the rendering processing as to the element (2) lower by one order than the element (3) having been processed among the plural elements which logical arithmetic processing orders are interpreted by the print data interpreting portion 13.

Figure 5A:
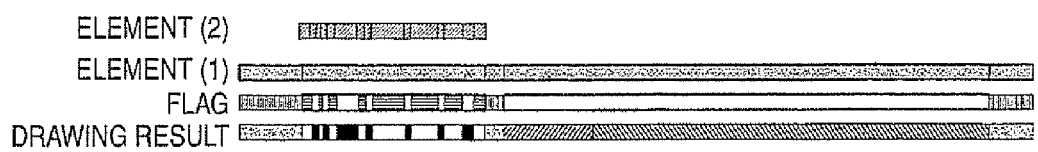
FIGS. 5A-5C are Drawings for explaining the logical arithmetic processing of the second embodiment.

The rendering processing portion 1C receives the kind of the logical arithmetic processing of the element (2) as the logical arithmetic processing from the print data interpreting portion 13, at the time of performing the processing of the element (2). Since the kind of the logical arithmetic processing of the element (2) is the logical arithmetic processing, the rendering processing portion 1C sets the background flags with respect to the pixel areas where the un-drawing flags are set within the pixel region of the element (2) as shown in FIG. 5A.

Figure 5B:
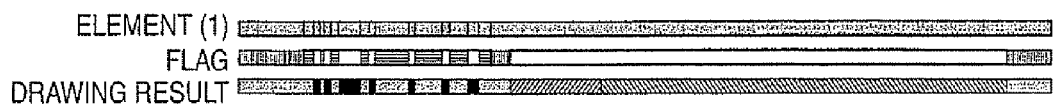

The rendering processing portion 1C performs the rendering processing as to the element (1) lower by one order than the element (2) among the plural elements which logical arithmetic processing orders are interpreted by the print data interpreting portion 13. As shown in FIG. 5B, the rendering processing portion 1C outputs the pixel information of the element (1) as the drawing results to the pixel areas where the un-drawing flags are set within the pixel region of the element (1) on the noticed line.

When the processings reach the element of the lowermost order, the rendering processing portion 1C switches the processing order from the element of the lowermost order toward the element of the uppermost order. Then, as shown in FIG. 5B, the rendering processing portion extracts the image areas where the un-drawing flags are set and outputs the pixel information of the element (1) of the lowermost order only to the areas.

Figure 5C:
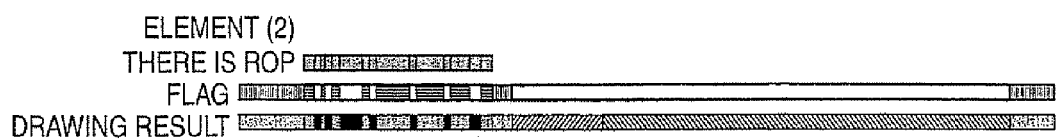

Next, the rendering processing portion 1C subjects the element (2) higher by one order than the element (1) to the logical arithmetic processing with respect to the image areas where the un-drawing flags are set as shown in FIG. 5C.

In other words, the logical calculation is preformed between the pixel information of the element (1) outputted to the image areas having been processed where the un-drawing flags are set as the drawing results and the pixel information of the element (2) and the calculation results is outputted as the drawing results. Since there is no further element which overlaps with the area of the background flag, the processing is completed.

According to such the processing, even when the logical arithmetic processing is contained in the logical arithmetic processing, since the simple overwrite processing is performed as to the elements from the upper-order side to the lower-order side with respect to the areas other than the areas subjected to the logical arithmetic processing and thereafter the remaining areas having not been subjected to the processing are subjected to the logical arithmetic processing, the wasteful processing of the superimposition can be suppressed.

<3. Image Processing Program>

Next, the image processing program according to the implementation mode will be explained. The image processing program according to the implementation mode includes steps executed by the computer. The computer includes a processing portion for executing the image processing program according to the implementation mode, a memory portion for storing the program and various kinds of data, and an input/output portion.

In stead of incorporating the computer into the image processing apparatus explained above, the computer may be incorporated into a computer such as a personal computer, an image recording/reproducing apparatus or an electronic device such as a portable terminal capable treating information. Further, the image processing program according to the implementation mode may be recorded in a recording medium such as a CD-ROM or distributed via a network.

The image processing program explained bellow is executed by the image processing apparatus realized as a computer.

[Image Processing Program of First Embodiment]

Figure 6:
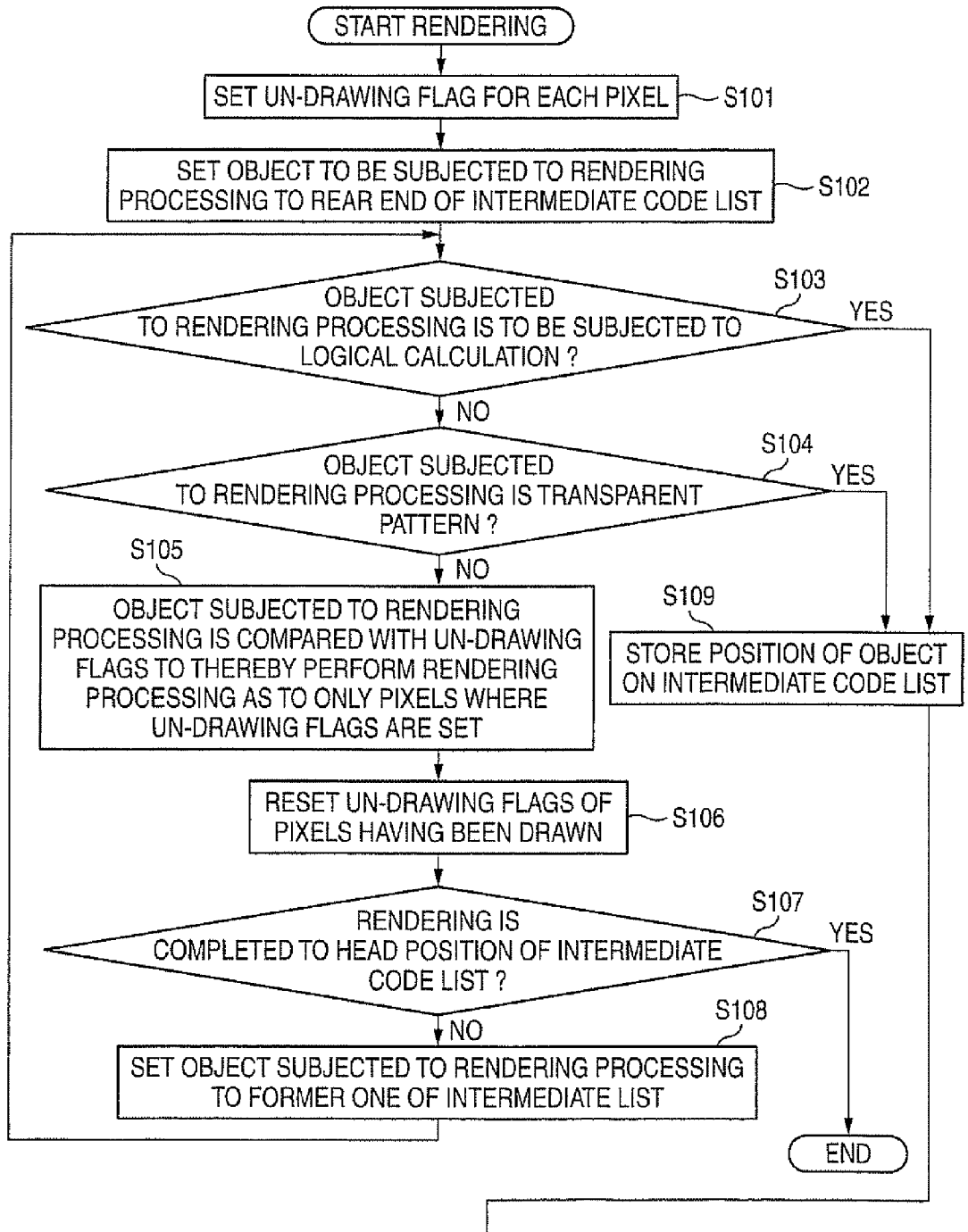
FIG. 6 is a flowchart for explaining an image processing program coping with the image processing according to the first embodiment.

FIG. 6 is a flowchart for explaining the image processing program coping with the image processing according to the first embodiment. First, an un-drawing flag representing that the drawing has not been performed yet is provided for each of the pixels of the rendering unit (a band, a scanning line etc.), and the un-drawing flags are set for all the pixels at the time of starting the rendering processing (step S101).

Next, with respect to the object (element) subjected to the rendering processing, the intermediate codes are set at the reverse side of the drawing order (uppermost-order side) irrespective to whether or not the logical arithmetic processing using the logical operation or the mask pattern etc. is contained (step S102).

Next, it is determined whether or not the object subjected to the rendering processing is to be subjected to the logical arithmetic processing (step S103). When the object is to be subjected to the logical arithmetic processing, the processing of step S109 and the succeeding steps are executed. These processings will be explained later. On the other hand, when the object is not to be subjected to the logical arithmetic processing, it is determined whether or not the object subjected to the rendering processing is a transparent pattern (step S104). When the object subjected to the rendering processing is the transparent pattern, the processing of step S109 and the succeeding steps are executed.

When the object subjected to the rendering processing is not the transparent pattern, the object subjected to the rendering processing is compared with the un-drawing flags to thereby perform the rendering processing as to only pixels where the un-drawing flags are set (step S105). After the rendering processing, the un-drawing flags of the pixels thus drawn are reset (S106).

Next, it is determined whether or not the rendering processing is completed to the object at the head position (lowermost-order) of the intermediate code list (step S107). When it is determined to be yes, the processings are completed. On the other hand, when it is determined to be no, the processing returns to step S103 and the aforesaid processings are repeated until the lowermost-order object (step S108)

Next, the processings of step S109 and the succeeding steps will be explained. When the object subjected to the rendering processing is to be subjected to the logical arithmetic processing (Yes in step S103) or the object subjected to the rendering processing is the transparent pattern (Yes in step S104), the position of the object on the intermediate code list is stored (step S109).

Next, the object subjected to the rendering processing is set to the head position (lowermost-order) of the intermediate code list (step S110). Then, the object subjected to the rendering processing is compared with the un-drawing flags to thereby perform the rendering processing as to only pixels where the un-drawing flags are set (step S111).

Next, it is determined whether or not the rendering processing is completed to the object having been stored in step S109 (step S112). When it is determined to be yes, the processings are completed. On the other hand, when it is determined to be no, the process returns to step S111 and the aforesaid processings are repeated until the object having been stored (step S113)

[Image Processing Program of Second Embodiment]

Figure 7:
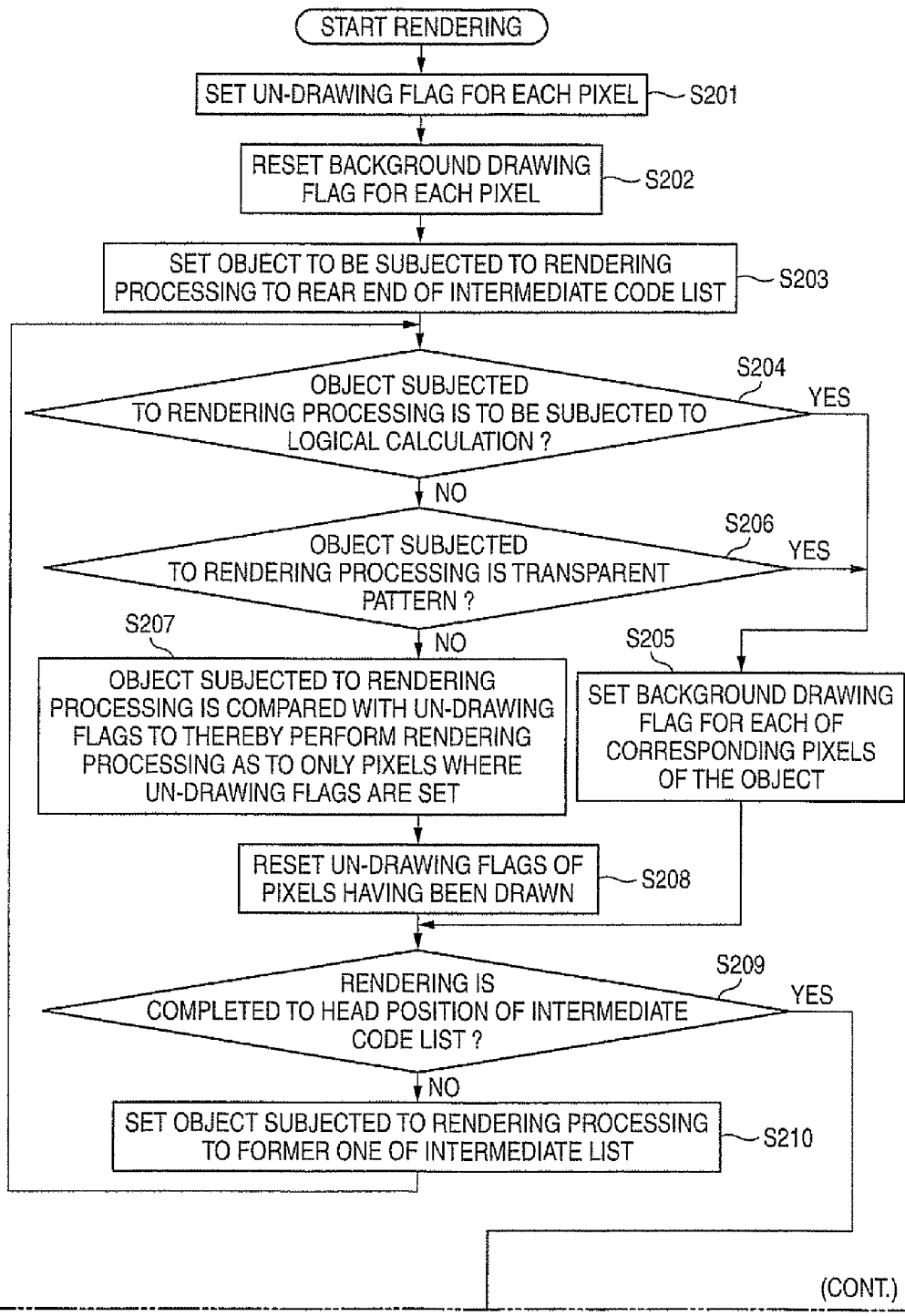
FIG. 7 is a flowchart for explaining an image processing program coping with the image processing according to the second embodiment.

FIG. 7 is a flowchart for explaining the image processing program coping with the image processing according to the second embodiment. First, an un-drawing flag representing that the drawing has not been performed yet is provided for each of the pixels of the rendering unit (a band, a scanning line etc.), and the un-drawing flags are set for all the pixels at the time of starting the rendering processing (step S201). Then, background drawing flags (background flags) representing pixels subjected to the logical arithmetic processing later are prepared and the background flags of all pixels are reset (step S202).

Next, with respect to the object (element) subjected to the rendering processing, the intermediate codes are set at the reverse side of the drawing order (uppermost-order side) irrespective to whether or not the logical arithmetic processing using the logical operation or the mask pattern etc. is contained (step S203).

Next, it is determined whether or not the object subjected to the rendering processing is to be subjected to the logical arithmetic processing (step S204). When the object is to be subjected to the logical arithmetic processing, the background drawing flags of the corresponding pixels of the object are set (step S205). On the other hand, when the object is not to be subjected to the logical arithmetic processing, it is determined whether or not the object subjected to the rendering processing is a transparent pattern (step S206). When the object subjected to the rendering processing is the transparent pattern, the background drawing flags of the corresponding pixels of the object are set (step S205).

When the object subjected to the rendering processing is not the transparent pattern, the object subjected to the rendering processing is compared with the un-drawing flags to thereby perform the rendering processing as to only pixels where the un-drawing flags are set (step S207). After the rendering processing, the un-drawing flags of the pixels thus drawn are reset (S208).

Next, it is determined whether or not the rendering processing is completed to the object at the head position (lowermost-order) of the intermediate code list (step S209). When it is determined to be no, the processing returns to step S204 and the aforesaid processings are repeated until the lowermost-order object (step S210)

When the rendering processing is completed to the object of the lowermost-order, it is determined whether or not there is a pixel where the background drawing flag is set (step S211). When it is determined to be no, the processings are completed. On the other hand, when it is determined to be yes, the object subjected to the rendering processing is set to the head position (lowermost-order) of the intermediate code list (step S212).

Then, the object subjected to the rendering processing is compared with the background drawing flags to thereby perform the rendering processing as to only pixels where the background drawing flags are set (step S213). Next, it is determined whether or not the rendering processing is completed to the object at the rear end (uppermost-order) of the intermediate code list (step S214). When it is determined to be yes, the processings are completed. On the other hand, when it is determined to be no, the processing returns to step S213 and the aforesaid processings are repeated to the object having been stored (step S215).

In the concrete examples of the image processings and the image processing programs according to the first and second embodiments, in the case of the configuration where the rendering processing is performed on the scanning line unit basis, the un-drawing flags and the background drawing flags may be expressed as the list of edges representing the coordinates of the start point and the end point of the pixel area where these flags are set continuously. Thus, in the case of retrieving a plurality of areas, these areas can be retrieved continuously and the matching operation between each of the objects and pixels where the respective flags are set can be performed at a high speed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
    an interpreting unit that interprets (i) an order of a logical arithmetic processing and (ii) a kind of a logical arithmetic processing as to a plurality of elements contained in an image information being inputted;
        wherein the kind of the logical arithmetic processing includes: (i) a simple overwrite processing, and (ii) a logical arithmetic processing; and
    a drawing unit that, in a case of drawing the image information as raster data,
        draws from an element of an upper-order side in order of the logical arithmetic processing interpreted by the interpreting unit with respect to an area that is interpreted to be processed by the simple overwrite processing for giving priority to an uppermost-order side element as the kind of the logical arithmetic processing interpreted by the interpreting unit, and
        draws using a calculation sequentially from an element of a lower-order side in order of the logical arithmetic processing interpreted by the interpreting unit with respect to an area that is interpreted to be processed by the logical arithmetic processing for using the calculation as to the overlapped elements as the kind of the logical arithmetic processing interpreted by the interpreting unit.

2. The image processing apparatus according to claim 1, wherein the drawing unit draws in an order from an area including the element of the uppermost-order side toward an area including the element of the lower-order side in order of the logical arithmetic processing interpreted by the interpreting unit, and when it becomes necessary to draw an area including an element to be subjected to the logical arithmetic processing on a way of processing, thereafter draws in an order from an area including an element of the lowermost-order side toward an area including the element of the upper-order side in order of the logical arithmetic processing with respect to an area having not been processed.

3. The image processing apparatus according to claim 1, wherein the drawing unit draws in an order from an area including the element of the uppermost-order side toward an area including the element of the lower-order side in order of the logical arithmetic processing interpreted by the interpreting unit, and when it becomes necessary to draw a first area including the element to be subjected to the logical arithmetic processing on a way of processing, draws in an order from an area including the element of the upper-order side toward an area including the element of the lower-order side in order of the logical arithmetic processing with respect to an area having not been processed except for the first area, and then draws in an order from an area including the element of the lowermost-order side toward an area including the element of the upper-order side in order of the logical arithmetic processing with respect to the first area.

4. The image processing apparatus according to claim 1, wherein the drawing unit includes a flag holding unit that holds a flag representing that an area corresponds to the logical arithmetic processing interpreted by the interpreting unit as the kind of the logical arithmetic processing, and draws the area of the logical arithmetic processing based on the flag held in the flag holding unit.

5. The image processing apparatus according to claim 1, further comprising:
a text generation portion that generates contour data of a text data adapted to a coordinate space of an output data, the text data being contained in the image information being inputted.

6. The image processing apparatus according to claim 1, further comprising:
a figure dividing conversion portion that divides a graphic data, which has been adapted to a coordinate space of an output data, into an aggregate of simple figures, wherein the aggregate is an aggregate of geometric data such as triangles and trapezoids.

7. A non-transitory computer readable storage medium storing a program causing a computer to execute a process for image processing, the process comprising:
interpreting (i) an order of a logical arithmetic processing and (ii) a kind of a logical arithmetic processing as to a plurality of elements contained in image information being inputted;
wherein the kind of the logical arithmetic processing includes: (i) a simple overwrite processing, and (ii) a logical arithmetic processing; and
drawing, in a case of drawing the image information as raster data, from an element of an upper-order side in order of the logical arithmetic processing interpreted by the interpreting with respect to an area that is interpreted to be processed by the simple overwrite processing for giving priority to an uppermost-order side element as the kind of the logical arithmetic processing interpreted by the interpreting, and
drawing using calculation sequentially from an element of a lower-order side in order of the logical arithmetic processing interpreted by the interpreting with respect to an area that is interpreted to be processed by the logical arithmetic processing for using calculation as to the overlapped elements as the kind of the logical arithmetic processing interpreted by the interpreting.

8. The non-transitory computer readable storage medium storing the program causing the computer to execute the process for image processing according to claim 7, wherein the drawing in an order from an area including the element of the uppermost-order side toward an area including the element of the lower-order side in order of the logical arithmetic processing interpreted by the interpreting, and when it becomes necessary to draw an area including the element to be subjected to the logical arithmetic processing on a way of processing, thereafter drawing in an order from an area including an element of the lowermost-order side toward an area including the element of the upper-order side in order of the logical arithmetic processing with respect to an area having not been processed.

9. The non-transitory computer readable storage medium storing the program causing the computer to execute the process for image processing according to claim 7, wherein the drawing in an order from an area including the element of the uppermost-order side toward an area including the element of the lower-order side in order of the logical arithmetic processing interpreted by the interpreting, and when it becomes necessary to draw a first area including the element to be subjected to the logical arithmetic processing on a way of processing, drawing in an order from an area including the element of the upper-order side toward an area including the element of the lower-order side in order of the logical arithmetic processing with respect to an area having not been processed except for the first area, and then drawing in an order from an area including the element of the lowermost-order side toward an area including the element of the upper-order side in order of the logical arithmetic processing with respect to the first area.

10. An image processing apparatus, comprising:
an interpreting unit that interprets (i) an order of a logical arithmetic processing and (ii) a kind of a logical arithmetic processing as to a plurality of elements contained in an image information being inputted;
wherein the kind of the logical arithmetic processing includes: (i) a simple overwrite processing, and (ii) a logical arithmetic processing; and
a drawing unit that, in a case of drawing the image information as raster data,
draws from an element of an upper-order side in order of the logical arithmetic processing interpreted by the interpreting unit with respect to an area that is interpreted to be processed by the simple overwrite processing for giving priority to an uppermost-order side element as the kind of the logical arithmetic processing interpreted by the interpreting unit, and
draws using a calculation sequentially from an element of a lower-order side in order of the logical arithmetic processing interpreted by the interpreting unit with respect to an area that is interpreted to be processed by the logical arithmetic processing for using the calculation as to the overlapped elements as the kind of the logical arithmetic processing interpreted by the interpreting unit, and wherein the drawing unit draws
- (i) in an order from an area including the element of the uppermost-order side toward an area including the element of the lower-order side in order of the logical arithmetic processing interpreted by the interpreting unit, and
- (ii) when it becomes necessary to draw a first area including the element to be subjected to the logical arithmetic processing on a way of processing,
  - draws in an order from an area including the element of the upper-order side toward an area including the element of the lower-order side in order of the logical arithmetic processing with respect to an area having not been processed except for the first area, and
  - then draws in an order from an area including the element of the lowermost-order side toward an area including the element of the upper-order side in order of the logical arithmetic processing with respect to the first area.

* * * * *